United States Patent Office 2,922,435
Patented Jan. 26, 1960

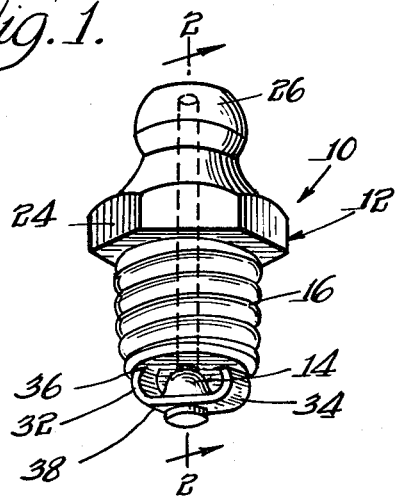
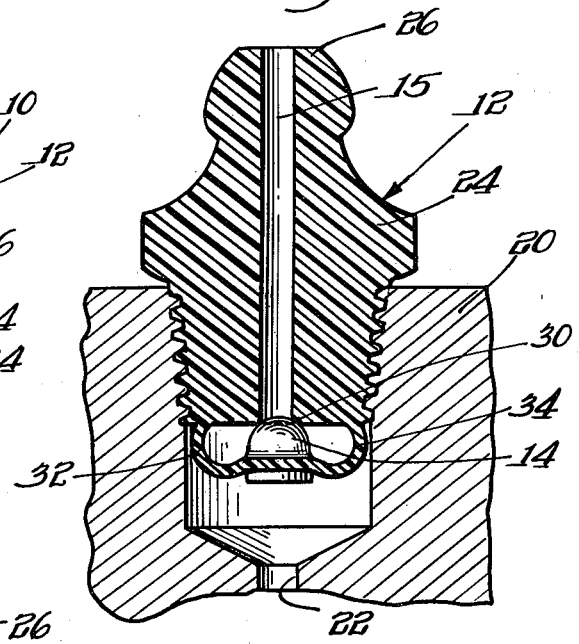
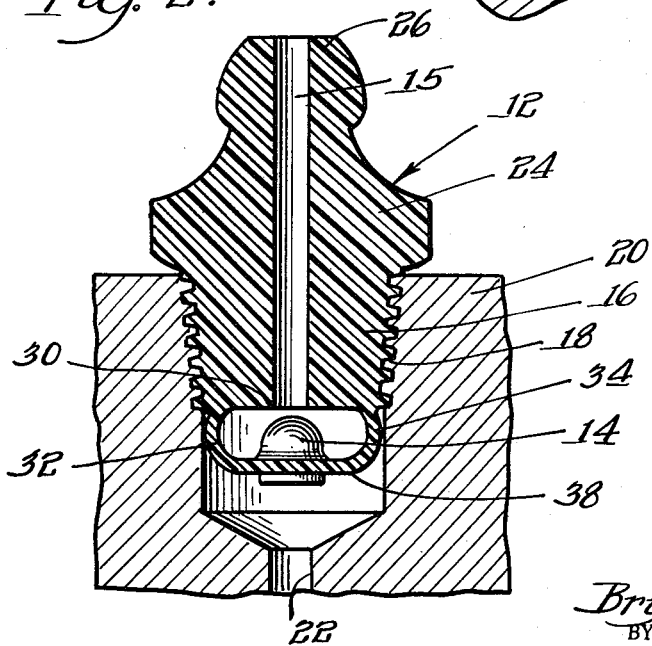
INVENTOR.
Bryant Edwards

2,922,435
GREASE FITTING

Bryant Edwards, Chicago, Ill., assignor to Illinois Tool Works, Chicago, Ill., a corporation of Illinois Original application January 28, 1955, Serial No. 484,758, now Patent No. 2,797,703, dated July 2, 1957. Divided and this application March 26, 1957, Serial No. 648,631

2 Claims. (Cl. 137—521)

The present invention relates to a novel fitting or valve for controlling the flow of fluid material and more particularly, to a novel fitting or valve through which a lubricant such as grease and the like can be forced into a system and which automatically functions to prevent the lubricant from leaking from the system. This application is a division of my co-pending application Serial No. 484,758, filed January 28, 1955, now patent No. 2,797,703.

Various metal grease fittings have heretofore been suggested which generally function in a satisfactory manner but which include relatively complicated spring and valve mechanisms so that they are expensive to manufacture. Furthermore, such heretofore suggested fittings which include a metal body adapted to be threaded into a casting or other part are not always satisfactory since, for example, if the lubricant or grease in the system is under a high pressure, a portion of the lubricant may leak past the threads of the fitting and if the apparatus is subjected to substantial vibrations, the threaded body may work loose.

It is a primary object of the present invention to provide a novel grease fitting or valve structure having simplified valve means so that the device may be more economically manufactured.

A more specific object of the present invention is to provide a novel fitting of the type mentioned above which may be easily and economically manufactured from a plastic material.

Another more specific object of the present invention is to provide a novel grease fitting or the like having a plastic body and a valve member, which body has integral resilient elements for operatively retaining the valve member.

Further objects of the present invention are to provide a novel plastic grease fitting adapted to be threaded into a workpiece, which fitting will not work loose and will prevent leakage of the fluid material or lubricant even when the lubricant is placed under high pressure.

A more specific object of this invention is to provide a novel fitting of the above described type which can be molded or otherwise formed in one piece.

Other objects and advantages of the present invention will become apparent from the following description and the accompanying drawings wherein:

Fig. 1 is a perspective view showing a fitting embodying the principles of this invention;

Fig. 2 is a sectional view of the fitting taken along line 2—2 in Fig. 1 and further showing a fitting mounted in an apertured workpiece; and Fig. 3 is a sectional view similar to Fig. 2 and further showing how the valve of the fitting is operated by pressure within the system to close the valve and prevent fluid material or lubricant from leaking through the fitting and out of the system.

Referring now more specifically to the drawings wherein like parts are designated by the same numerals throughout the various figures, a fitting embodying features of the present invention is generally designated by the numeral 10 and is adapted to be molded or otherwise made from suitable plastic material such, for example, as nylon. The fitting 10 includes a body member 12 having a bore 15 therethrough and a valve member 14 which is integrally joined to the body portion in the manner described below for movement from the normal open position shown in Fig. 2 to the closed position shown in Fig. 3 under influence of pressure within the system to which the fitting is applied.

The plastic body member includes a threaded portion 16 which is adapted to be threaded into an aperture 18 of a workpiece 20. As will be understood, the workpiece 20 forms a part of a fluid or lubricating system and a passageway 22 communicates with the bottom end of the aperture 18 for directing the fluid material or lubricant forced through the fitting to other portions of the system. It should be noted that since the body member 12 is made from a resilient plastic material such as nylon, the threads thereof will closely conform to and tightly grip the threads of the workpiece so as to prevent the fitting from working loose and also to prevent any of the fluid material or lubricant from leaking past the threads. The body member 12 is also provided with a nut portion 24 to facilitate application thereof to the workpiece and a suitably formed nipple portion 26 to which the tip of a grease gun or the like may be applied in a known manner.

The passageway 15 extends axially through the plastic body member and the inner or outlet end of the passageway is defined by a valve seat 30. In accordance with a feature of the present invention, extremely simple means is provided for retaining the valve member 14 in cooperative relationship with the valve seat. This means includes a pair of resilient plastic flexure spring elements or arms 32 and 34 which are integral with and extend generally axially from the inner end 36 of the threaded portion of the body member 12. The elements 32 and 34 are integrally connected with a transverse element 38 with which the valve member 14 is integrally formed, or, if desired, on which the valve member 14 may be mounted. As shown in Fig. 2, the flexure spring elements or arms 32 and 34 are curved so that the valve member is normally yieldably held in axial alignment with and spaced from the valve seat 30.

The operation of the above described structure is as follows. A grease gun or the like is applied to the nipple 26 in the usual manner and the fluid material or grease is forced into the passageway 15 under pressure. The grease under pressure unseats the valve member as shown in Fig. 2 and this movement of the valve member is permitted by flexing or straightening of the arms 32 and 34. After the valve member is unseated, the grease flows between the arms, which arms present a plurality of laterally or radially opening passageways having a cross sectional area greater than that of the passageway 15 and extending from the vicinity of the valve seat, into the lower portion of the aperture 18 and out through the passageway 22. When the grease gun or the like is removed, the back pressure of grease or the like in the system forces the valve member outwardly against the action of the arms 32 and 34 until it engages the valve seat as shown in Fig. 3, to prevent the lubricant in the system from leaking out through the passageway 15.

From the above description it is seen that the present invention has provided a novel plastic fitting which fully satisfies the objects heretofore set forth. More specifically, it will be appreciated that the fitting of this invention is of extremely simple construction and may be economically manufactured. More specifically, it is seen that the valve mechanism of the fitting is of extremely simple construction, yet is highly efficient. Furthermore, it is seen that the use of resilient plastic material for the body of the fitting prevents the fitting from working loose and prevents leakage past the threads of the fitting.

Other advantages of the plastic fitting of this invention are that the plastic fitting will not corrode as will certain metal fittings of the general type contemplated herein and the plastic fitting may be easily removed from the work in the event that it becomes damaged.

While the preferred embodiment of the present invention has been shown and described herein, it is obvious that many structural details may be changed without departing from the spirit and scope of the appended claims.

The invention is claimed as follows:

1. A valve structure for assembly with an apertured member in a system in which a fluid back pressure will exist in the vicinity of the valve structure, comprising a one piece plastic body member having a passageway therethrough and a valve seat at an inner end thereof and defining an inner end of said passageway, said body member having a predetermined radial wall thickness at said inner end thereof, a valve member aligned with and engageable with said valve seat for controlling flow of fluid through said passageway, a plurality of circumferentially spaced resilient relatively thin straplike sections having a thickness substantially less than said predetermined wall thickness and integrally joined with said body member inner end and extending therefrom generally axially away from said valve seat, a transverse section integrally joining ends of said resilient sections and supporting said valve member, said resilient sections presenting lateral passageways extending from the vicinity of the valve seat and having a combined cross sectional area at least as great as said first mentioned passageway to facilitate flow of fluid from the vicinity of the valve seat, and said resilient sections normally spacing said transverse section and the valve member supported thereby axially away from said valve seat, said resilient sections being curved along their lengths and adapted to flex when fluid back pressure in the system urges the valve member toward the valve seat to guide the valve member to the valve seat.

2. A valve structure for assembly with an internally threaded member comprising a one piece externally threaded plastic body member having a passageway therethrough and a valve seat at an inner end thereof and defining an inner end of said passageway, said body member having a predetermined radial thickness at said inner end thereof, a plurality of resilient sections circumferentially spaced about said valve seat and integral with said body member inner end and extending therefrom generally axially away from the valve seat, said resilient sections having a radial thickness substantially less than said predetermined radial thickness, a valve member integrally joined to and supported by ends of said sections spaced away from said valve seat, said resilient sections normally spacing said valve member axially away from said valve seat, said resilient sections having substantially concavo-convex longitudinal cross section and being adapted to flex when any fluid back pressure in a system in which the valve structure is assembled urges the valve member toward the valve seat to guide the valve member to the valve seat, and an apertured head portion integral with an end of said body member opposite from said valve seat and communicating with said passageway and cooperable with means for introducing fluid through said passageway.

References Cited in the file of this patent

UNITED STATES PATENTS

| | | |
|---|---|---|
| 670,794 | Lott | Mar. 26, 1901 |
| 1,315,955 | Gill | Sept. 16, 1919 |
| 1,937,982 | Rudolph | Dec. 5, 1933 |
| 2,207,212 | Arey | July 9, 1940 |
| 2,297,994 | Vellinga | Oct. 6, 1942 |
| 2,355,862 | Harper | Aug. 15, 1944 |
| 2,825,479 | Litzie | Mar. 4, 1958 |

FOREIGN PATENTS

| | | |
|---|---|---|
| 366,479 | Italy | Dec. 28, 1938 |